Sept. 6, 1960
L. C. WILCOXEN
2,951,577
ARTICULATED CONVEYOR APPARATUS
Filed Nov. 12, 1958
2 Sheets-Sheet 1
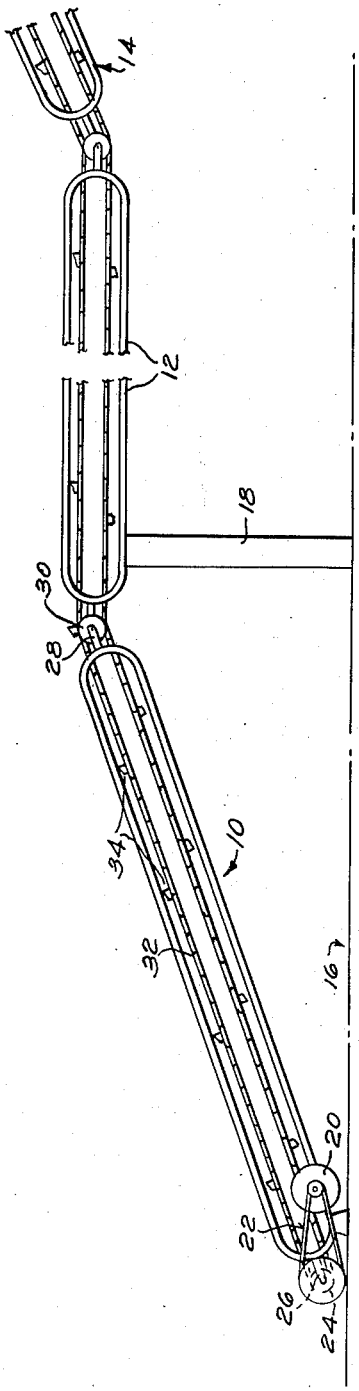
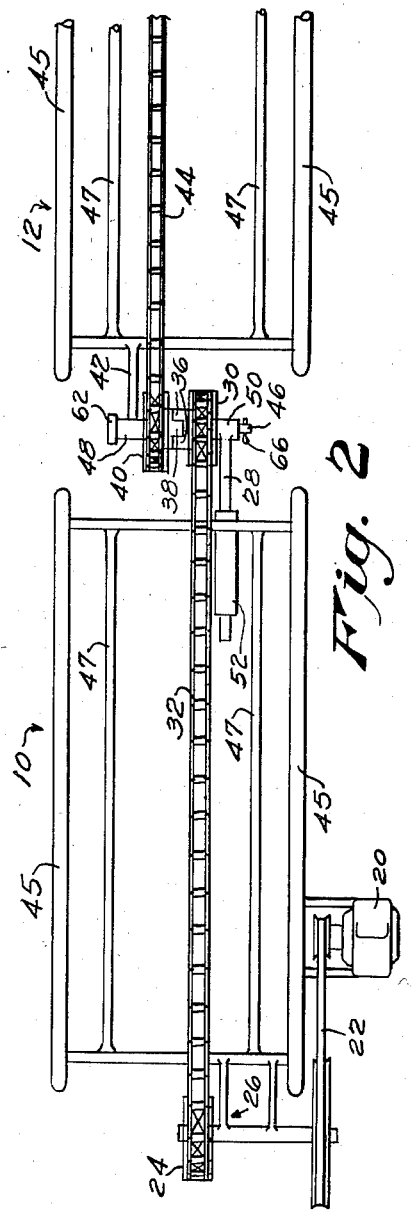
INVENTOR:
Leon C. Wilcoxen
BY
Homer R. Montague
ATT'Y.

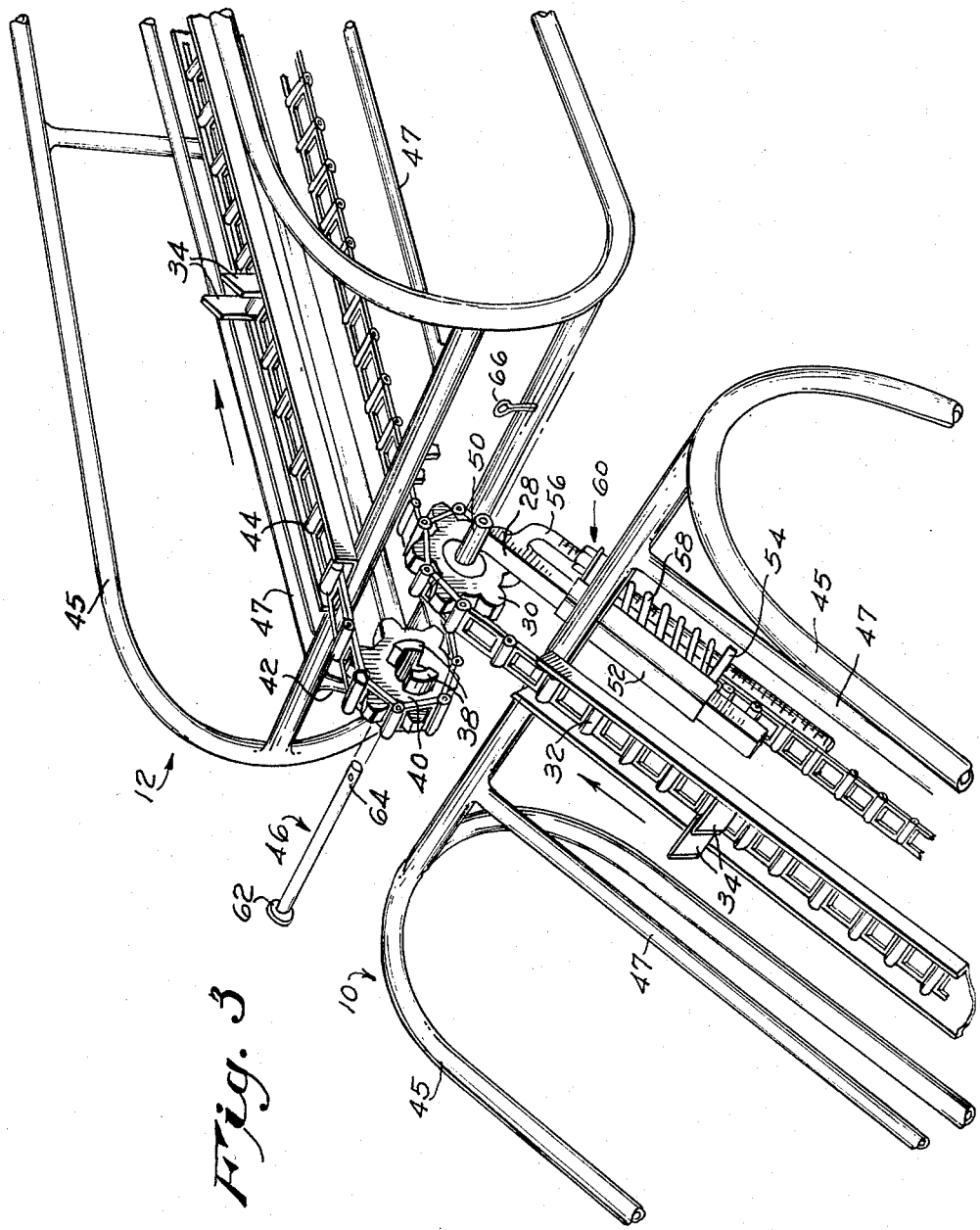

United States Patent Office 2,951,577
Patented Sept. 6, 1960

2,951,577

ARTICULATED CONVEYOR APPARATUS

Leon C. Wilcoxen, Dodge City, Kans., assignor to Mayrath Machinery Company, Inc., a corporation of Kansas Filed Nov. 12, 1958, Ser. No. 773,287

2 Claims. (Cl. 198—82)

This invention pertains generally to conveyor apparatus, and more particularly to an articulated conveyor apparatus having improved means for interconnecting the adjacent ends of successive body members thereof.

It is well known in the conveyor art to employ an articulated conveyor where the path along which the articles or the like to be conveyed is somewhat irregular. By means of the articulated construction, the several members of the conveyor apparatus may be pivotally mounted with respect to the respective adjacent members, and the desired conveying path may therefore easily be effected by a suitable relative positioning of the several interconnected members of the conveyor apparatus. Further, it is often desirable to convey articles over a path the length of which is in excess of a dimension which might be considered the longest convenient length for a single unitary conveyor device. In such a case it is advantageous to employ an appropriate number of cooperating conveyor members in an articulated apparatus, each of the individual members being of a convenient length, and the total length of the articulated apparatus being sufficient to reach over the distance required.

The prior art affords several examples of articulated conveyor devices which have proved successful in many applications. However, in many instances the conveyors of the prior art lack sufficient flexibility in the manner in which the several elements of the articulated device may be relatively positioned. In addition, the articulated conveyors of the prior art involve a rather cumbersome and time-consuming procedure for the connection or disconnection of adjacent members thereof. This is especially true in those conveyors which employ an endless conveyor means in connection with each of the several elements of the articulated device. In such conveyors, it is generally necessary to dismantle the common support means which engage and rotatably support the adjacent ends of the respective endless conveyors (or, alternatively, to open one of the endless conveyor members to remove it from the support means), and in addition one or more bolts or other securing means must be removed from interconnecting frames or brackets in order to separate two adjacent elements of the articulated conveyor frame.

It is accordingly a primary object of the present invention to provide an articulated conveyor apparatus wherein the several adjacent members of same may easily and quickly be engaged and disengaged.

A further object of the present invention is to provide an articulated conveyor apparatus having a greater degree of pivotal freedom between the several elements thereof.

Another object of the present invention is to provide an improved means of interconnecting adjacent members of an articulated conveyor apparatus, whereby the means for achieving such interconnection provides both mutual support for the two adjacent members and a driving connection between the endless conveyor members mounted on the respective adjacent members of the articulated apparatus.

In accordance with the present invention, the above and other objects are achieved by means of an articulated conveyor apparatus wherein each of the interconnected members thereof has an endless conveyor means mounted thereon over respective rotary support members mounted at each end of each of the frame members of the apparatus. These rotary support means are mounted in outrigged relation at the respective ends of the several frame members, and the paired rotary supports on the adjacent ends of successive frame members are held together for rotation about a substantially common axis. Means are provided on the rotary support members to effect a positive drive of one of each pair in response to the rotary motion of the other, such rotary motion being transmitted to each of the driving rotary members by means of the endless conveyor member associated therewith. The means for holding the paired rotary members together serves as the sole means for interconnecting the adjacent ends of the several successive frame members of the articulated conveyor apparatus, and the manner of mounting the rotary members thereon permits relative pivotal motion between adjacent frame members about both the axis of rotation of the rotary members and about another axis substantially perpendicular thereto.

With the above considerations and objects in mind, the invention itself will now be described in connection with a preferred embodiment thereof given by way of example and not of limitation, and with reference to the accompanying drawings, in which:

Fig. 1 is a side elevation view of the articulated conveyor apparatus of the present invention.

Fig. 2 is a plan view of one of the joints or interconnections made between an adjacent pair of the frame members of the articulated conveyor apparatus of the present invention.

Fig. 3 is an exploded perspective view to a greater scale of the means interconnecting adjacent frame members.

Referring now to Fig. 1 of the drawings, an articulated conveyor apparatus is shown, having a plurality of frame members 10, 12 and 14. While only three such frame members are shown in Fig. 1, it will be understood that any desired number of such members may be connected in the series relationship shown in order to extend from the loading end of the apparatus at the lower end of frame member 10 to a discharge point (not shown) at some remote location. The dash line 16 is intended to represent the ground surface or a floor or the like upon which member 10 is to rest, and the support indicated at 18 may be a structural member of a building or the like (such as the bottom ledge of an open window or door) or any other suitable support means over which it is intended to convey the articles in question.

At some suitable point near the lower end of frame member 10 an electric motor 20 is mounted, along with suitable drive means indicated generally at 22 (and comprising a belt and pulley arrangement or an equivalent gearing device) for transmitting the rotary output of the motor to a sprocket 24 mounted in outrigged relation on frame member 10. A suitable bracket 26 is provided for this purpose, and the sprocket is mounted thereon by some suitable type of friction reducing means such as a ball bearing assembly or the like (not shown).

A bracket member 28 is mounted on the upper end of frame member 10 and serves as the mounting means for a sprocket 30. An endless chain 32 passes over and extends between sprockets 24 and 30, and is thereby mounted on the frame member 10 for conveying motion in the well known manner of endless conveyor operation. The particular structure shown in the drawings forming a part of this specification is well adapted to the art of conveying bales or similar packages of agricultural produce such as grain and the like, and a plurality of upstanding members 34 are provided for engagement with the bales as the latter are placed in the conveyor over the endless conveyor chain therein.

Frame members 12 and 14 are substantially identical to frame member 10, except for motor 20 (which may be an electric motor as shown, a gasoline driven engine, or any other suitable means for providing the desired rotary motion at sprocket 24). Each of the frame members 12, 14 and so on has an outrigged sprocket at each end thereof which cooperates with one of the sprockets of the adjacent frame member, and the conveyor chains of the several frame members are alternately offset in different directions to permit such cooperation, as will better be understood in connection with the description of the apparatus as shown in Fig. 2.

Referring now to Fig. 2, the means by which the adjacent ends of successive frame members are connected together may be more easily seen and understood. Sprocket 30 has a plurality of upstanding portions 36 on one face thereof which are interdigitated with cooperating upstanding portions 38 of sprocket 40 which is mounted on frame member 12 by means of a bracket 42. Sprockets 30 and 40 lie on opposite sides of the center line extending down the length of frame members 10 and 12, and it will be appreciated that corresponding sprockets at the other end of frame member 12, as well as at the adjacent ends of other successive frame members, are similarly placed, so that alternate conveyor chains lie on opposite sides of the center line in the manner shown in connection with conveyor chain 32 of frame member 10 and conveyor chain 44 of frame member 12. The individual frame members 10, 12 and so on each include a pair of side rails 45 which serve to keep the bales or other articles which are being conveyed from falling off to the side of the conveyor, and each frame member also includes a pair of bottom rail supports 47 at approximately the same level as the upper reach or run of the conveyor chain and along which the bottom face of the bales or the like slide while they are being conveyed under the influence of the moving conveyor chains 32, 44 and the like.

A pin member 46 or the like serves as the means for holding the two sprockets 30 and 40 in engagement, with pin 46 passing through both of the sprockets and forming a loose or sliding fit with a centrally located hole in each. Pin 46 thus provides a substantially common axis of rotation for the two paired sprockets, such axis being defined lengthwise of the pin member. It will be observed that pin member 46 also passes through the cylindrical end portions 48 and 50 of the respective brackets 42 and 28. Pin 46 also fits inside these cylindrical end portions in a loose manner, thereby permitting a limited degree of motion of the two frame members 10 and 12 about an axis which is perpendicular to the length of the pin member 46. Thus, the frame members 10 and 12 may be moved relative to each other not only about an axis generally defined by the pin member 46, but may also be moved relative to each other in the plane of the sheet of Fig. 2 of the drawings. This latter form of relative motion between the two adjacent frame members is permitted as a result of the loose fit of the pin member 46 in the cylindrical end portions 48 and 50 of the respective brackets which support sprockets 30 and 40, and by reason of the fact that no other supporting connection is made between the adjacent ends of the two frame members. Thus it is seen that both the driving connection between the conveyor chains of the adjacent frame members and the mutual support thereof is effected by means of the paired sprockets and the pin 46 which holds them together in driving engagement.

Fig. 3 shows in somewhat greater detail the structure of the several elements just described. Bracket 28 is preferably fitted within a mounting tube 52 or the like which is secured to frame member 10 and which has a depending bracket 54 secured thereto. An arm 56 parallel to the bracket 28 is connected at one end thereto, and the other end passes through an aperture in the bracket 54. A helical spring 58 is carried by the arm 56 and a nut and washer stop means 60 is threaded on the arm 56, the latter being threaded over the greater portion of its length. By means of such spring-biased mounting at one end of each of the frame members, the conveyor chains are kept under tension, and a means for relief of such tension is thus provided in case the chain becomes jammed or otherwise halted with the motor 20 still running.

Sprocket 30 is shown mounted for rotation with respect to the cylindrical portion 50 of bracket arm 28, and sprocket 40 is similarly mounted on the cylindrical portion of bracket 42. Upstanding portions 38 of sprocket 40 may clearly be seen in Fig. 3, with the depressed portions therebetween into which the upstanding portions of sprocket 30 fit in intedigitated engagement. Pin member 46 has an enlarged head 62 at one end thereof, and there is a hole 64 extending through the pin at a position near the other end thereof and through which a cotter pin 66 or some other suitable retaining means passes in order to secure the pin 46 between the two sprockets 30 and 40 when they are assembled together, and to hold the two sprockets in driving engagement.

The operation of the apparatus of the present invention is now apparent. Upon energization of the motor 20, the sprocket 24 begins to rotate and drive conveyor chain 32 which is engaged thereby. Members 34 on chain 32 are thus carried up the frame member 10 on the upper side thereof, and back down again on the under side thereof. Bales of straw or the like which are placed on the upper side of frame member 10 are engaged by these upstanding members 34, and are carried up the upper face of frame member 10 thereby. Due to the interdigitated engagement of the driving elements on the adjacent faces of the two sprockets 30 and 40, the rotation of sprocket 30 caused by the travel of conveyor chain 32 is transmitted to sprocket 40 and to conveyor chain 44 which is carried thereby. Thus, as a bale or other package is carried up over the end of the frame member 10, it is then engaged by one or more of the upstanding members carried by chain 44, and the cycle is then repeated to bring the bale or other package to the end of each next successive frame member until the last is reached and the bale is discharged from the conveyor apparatus.

In the setting up of the several frame members before a given operation thereof, pivotal motion may be achieved between each adjacent pair about an axis substantially defined by the pin members 46 which interconnect the several frame members. In addition, limited pivotal motion may be achieved between the adjacent frame members in a direction parallel to the plane of either of them (that is, about an axis perpendicular to the interconnecting pin members 46). As a result, the articulated conveyor apparatus of the present invention provides a great degree of flexibility in the manner in which the several members thereof may be relatively positioned, and the conveying direction is thus not limited to a straight line or even a single plane.

When it is desired to remove one or more of the several frame members, or to add one or more to an existing array, as well as when it is desired to initially put such an apparatus into operation or to close it down and dismantle it, it will be appreciated that the only members necessary to be removed are the several cotter pins and their respective pin members 46. The removal of a single cotter pin and the associated pin member 46 permits the disengagement of both the conveyor drive and the mutual support between two adjacent frame members.

The invention has been described above in some detail, and particularly with reference to its application to an articulated bale conveyor for agricultural products or the like. However, it will be apparent to those skilled in the art that the invention is also applicable to other articulated conveyor means which are designed to convey articles other than bales or the like. Further, it will be appreciated that the interfitting means on the paired sprockets at adjacent ends of successive portions of the articulated conveyor may be other than the interdigitated cooperating members shown herein. For example, such interconnecting drive means may take the form of one or more pins or the like mounted on one of the sprockets and engaging respective apertures in the other sprocket in a loose or sliding fit. Hence, the invention is not to be considered as limited to the particular details given, nor to the specific application to which reference has been made during the description of the apparatus, except insofar as may be required by the scope of the appended claims.

What is claimed is:

1. In an articulated conveyor apparatus having at least two elongated interconnected frame members, each of said frame members having a rotary conveyor-driving member extending beyond each end thereof, and each frame member having a bracket at each end thereof pivotally mounting the respective rotary member, the bracket extending from the trailing end of one frame member cooperating with the bracket extending from the leading end of the adjacent frame member to cooperatively support a transverse pivotal member, said pivotal member acting as the sole means to loosely and rotatably maintain the rotary member extending from the trailing end of one frame member in driving contact with the rotary member extending from the leading end of the next frame member, each of said rotary members being provided with means to interlock with its cooperating rotary member on the next frame, and an endless conveyor member for each frame carried by the rotary members mounted thereon, whereby operation of the endless conveyor member on one frame will cause operation of the conveyor members on the succeeding frames.

2. Conveyor apparatus in accordance with claim 1, in which each of said brackets has a bore extending along the pivotal mounting of its corresponding rotary member, and in which said transverse pivotal member comprises a pin extending loosely through both of said bores; and means on said pin for securing said brackets loosely to one another on the common axis of said rotary members.

References Cited in the file of this patent

UNITED STATES PATENTS

| 1,006,790 | Reinbold | Oct. 24, 1911 |
| 2,792,102 | Schuchert | May 14, 1957 |